US008315792B2

(12) United States Patent
Speier et al.

(10) Patent No.: US 8,315,792 B2
(45) Date of Patent: Nov. 20, 2012

(54) SYSTEM AND METHOD FOR TRAVEL ROUTE PLANNING USING SAFETY METRICS

(76) Inventors: Gary J. Speier, Eden Prairie, MN (US); Steven W. Lundberg, Edina, MN (US); Benjamin C. Armitage, Prior Lake, MN (US)

( * ) Notice: Subject to any disclaimer, the term of this patent is extended or adjusted under 35 U.S.C. 154(b) by 920 days.

(21) Appl. No.: 11/838,101

(22) Filed: Aug. 13, 2007

(65) Prior Publication Data

US 2009/0048771 A1    Feb. 19, 2009

(51) Int. Cl.
*G01C 21/00* (2006.01)
(52) U.S. Cl. .................... 701/400; 702/34; 73/588
(58) Field of Classification Search .................. 701/200, 701/400; 707/706; 702/34; 73/588; *G01C 21/00*
See application file for complete search history.

(56) References Cited

U.S. PATENT DOCUMENTS

| | | | | |
|---|---|---|---|---|
| 4,480,480 A | * | 11/1984 | Scott et al. | 73/769 |
| 5,270,708 A | * | 12/1993 | Kamishima | 340/995.24 |
| 5,657,003 A | * | 8/1997 | Fuentes | 340/690 |
| 5,798,949 A | * | 8/1998 | Kaub | 703/6 |
| 6,006,163 A | * | 12/1999 | Lichtenwalner et al. | 702/36 |
| 6,175,803 B1 | | 1/2001 | Chowanic et al. | |
| 6,192,758 B1 | * | 2/2001 | Huang | 73/579 |
| 6,662,141 B2 | * | 12/2003 | Kaub | 702/181 |
| 6,750,815 B2 | | 6/2004 | Michaelson et al. | |
| 6,847,889 B2 | | 1/2005 | Park et al. | |
| 6,980,093 B2 | * | 12/2005 | Oursler et al. | 340/425.5 |
| 7,049,952 B2 | | 5/2006 | Kulesz et al. | |
| 7,072,764 B2 | | 7/2006 | Donath et al. | |
| 7,162,363 B2 | | 1/2007 | Chinitz | |
| 7,188,026 B2 | | 3/2007 | Tzamaloukas | |
| 7,209,829 B2 | | 4/2007 | Litvack et al. | |
| 7,239,959 B2 | | 7/2007 | Rasmussen et al. | |
| 7,239,962 B2 | | 7/2007 | Plutowski | |
| 7,321,826 B2 | * | 1/2008 | Sheha et al. | 701/426 |
| 7,346,526 B2 | * | 3/2008 | Daughtrey et al. | 705/5 |
| 7,349,768 B2 | | 3/2008 | Bruce et al. | |
| 7,363,319 B2 | | 4/2008 | Cappellini | |
| 7,400,972 B2 | | 7/2008 | Kozak | |
| 7,565,155 B2 | * | 7/2009 | Sheha et al. | 455/456.1 |
| 7,647,206 B2 | * | 1/2010 | Ford | 702/183 |
| 8,000,892 B2 | * | 8/2011 | Banerjee | 701/433 |
| 8,090,598 B2 | * | 1/2012 | Bauer et al. | 705/4 |

(Continued)

FOREIGN PATENT DOCUMENTS

WO    WO-2009023219 A1    2/2009

OTHER PUBLICATIONS

"International Application Serial No. PCT/US2008/009683, Search Report mailed Nov. 12, 2008", 2 pgs.

(Continued)

*Primary Examiner* — Tuan C. To
(74) *Attorney, Agent, or Firm* — Schwegman, Lundberg & Woessner, P.A.

(57) ABSTRACT

Systems and methods are described to receive a safety preference; calculate a temporary route; analyze a portion of the temporary route to determine whether the portion is sufficiently safe based on the safety preference; modify the portion of the temporary route when the portion is not sufficiently safe; and present the temporary route. Other systems and methods are described.

17 Claims, 7 Drawing Sheets

U.S. PATENT DOCUMENTS

| | | |
|---|---|---|
| 2002/0143461 A1 | 10/2002 | Burns et al. |
| 2003/0135304 A1* | 7/2003 | Sroub et al. .................. 701/1 |
| 2005/0055248 A1 | 3/2005 | Helitzer et al. |
| 2006/0235739 A1* | 10/2006 | Levis et al. .................. 705/9 |
| 2006/0247852 A1 | 11/2006 | Kortge et al. |
| 2007/0024468 A1* | 2/2007 | Quandel et al. ............... 340/968 |
| 2007/0073480 A1 | 3/2007 | Singh |
| 2007/0088500 A1 | 4/2007 | Spinelli |
| 2007/0129880 A1 | 6/2007 | Thacher |
| 2007/0159355 A1 | 7/2007 | Kelly et al. |
| 2008/0293430 A1* | 11/2008 | Blom et al. ................ 455/456.1 |
| 2011/0208416 A1 | 8/2011 | Speier et al. |

OTHER PUBLICATIONS

"International Application Serial No. PCT/US2008/009683, Written Opinion mailed Oct. 6, 2009", 7 pgs.

\* cited by examiner

SYSTEM AND METHOD FOR TRAVEL ROUTE PLANNING USING SAFETY METRICS

FIELD

The present disclosure relates generally to computer systems. In an example embodiment, the disclosure relates to a system and method for travel route planning using safety metrics.

BACKGROUND

Computerized navigation systems may be used by travelers to provide route planning, location information, directions to or maps of places of interest, and other details of a journey. Some navigation systems provide detailed directions from a starting location to a destination location. The detailed directions may be determined with a focus on travel time or travel distance.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an example embodiment of the present disclosure. It will be evident, however, to one skilled in the art that the present disclosure may be practiced without these specific details.

Figure 1:
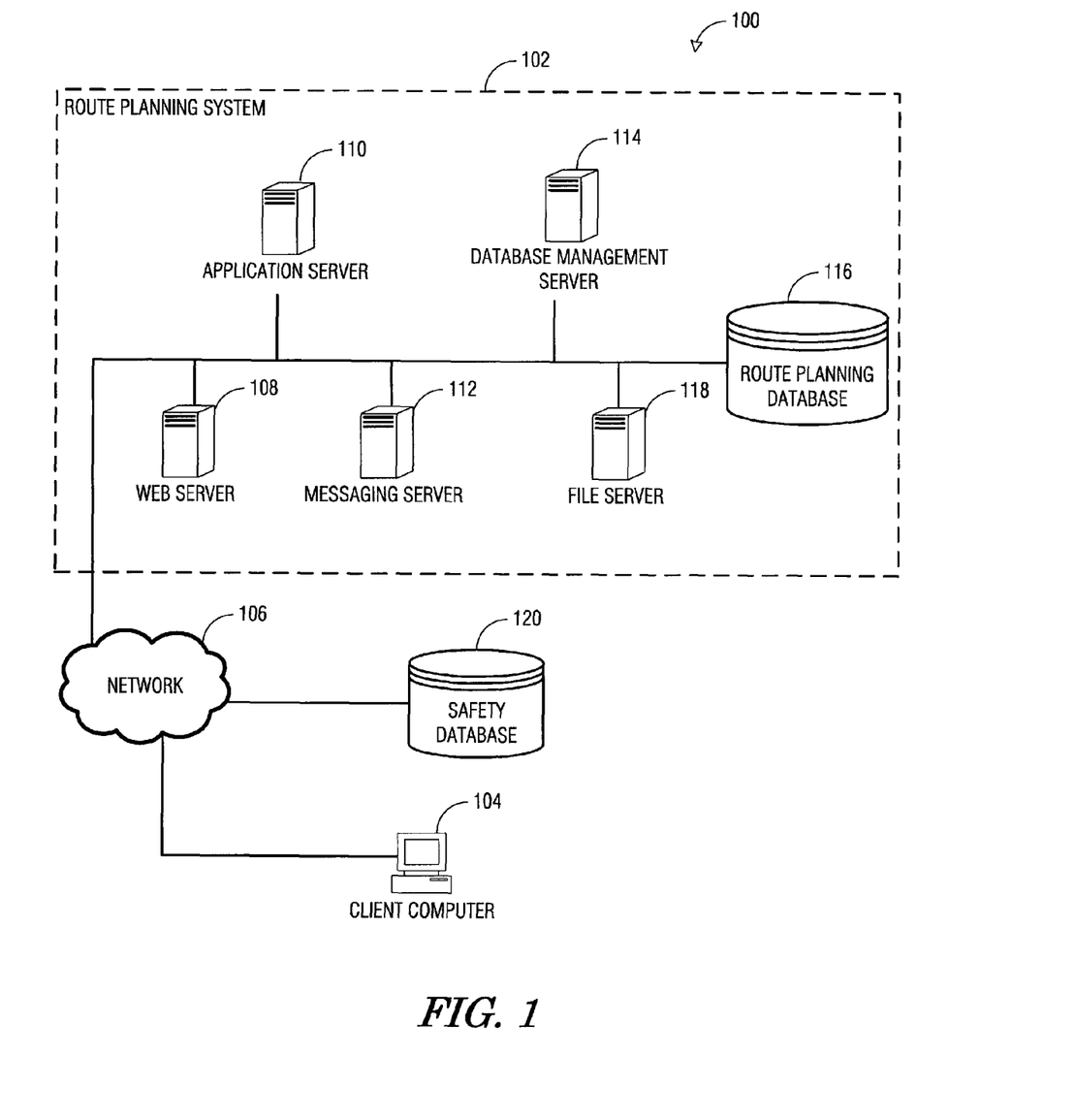
FIG. 1 is a diagram of a networked system, in accordance with an example embodiment.

FIG. 1 is a schematic view of a computer network system 100 according to various embodiments. The computer network system 100 includes a route planning system 102 and a client computer 104, communicatively coupled via a network 106. In addition, a safety database 120 is communicatively coupled to the network and accessible by the client computer 104 and the route planning system 102.

The client computer 104 may include a general-purpose computing device, such as a laptop, desktop, or hand-held computer; a specialized computing device, such as a on-board navigation device or a kiosk; or other devices, such as a mobile telephone or a personal digital assistant (PDA).

In an embodiment, the route planning system 102 includes a web server 108, an application server 110, a messaging server 112, a database management server 114, which is used to manage at least a route planning database 116, and a file server 118. The route planning system 102 may be implemented as a distributed system, for example one or more elements of the route planning system 102 may be located across a wide-area network from other elements of the route planning system 102. As another example, a server (e.g., web server 108, file server 118, database management server 114) may represent a group of two or more servers, cooperating with each other, in providing a pooled, distributed, or redundant computing model.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices coupled to the network 106 may be coupled to the network 106 via one or more wired or wireless connections. The wireless connections may be short-range (e.g., inductive telemetry or Bluetooth) or longer-range (e.g., IEEE 802.11, IEEE 802.x wireless communication, 3G, 4G, or cellular wireless) protocols.

The web server 108 may communicate with the file server 118 to publish or serve files stored on the file server 118. The web server 108 may also communicate or interface with the application server 110 to enable web-based presentation of information. For example, the application server 110 may consist of scripts, applications, or library files that provide primary or auxiliary functionality to the web server 108 (e.g., multimedia, file transfer, or dynamic interface functions). In addition, the application server 110 may also provide some or all of the interface for the web server 108 to communicate with one or more of the other servers in the route planning system 102, e.g., the messaging server 112 or the database management server 114.

The route planning database 116 may include data to calculate routes, provide directions, provide location information, and the like. For example, the route planning database 116 may include geographical or topological map data, road data, waterway data, railway data, lodging information (e.g., campgrounds, motor parks, or hotels), tourist destinations, retail store information (e.g., gas stations, grocery stores, laundromats, or shopping centers), and scenic destinations. The route planning database 116 may also include safety metrics or other safety data related to a transportation structure. In this description, a transportation structure may include structures such as roads, bridges, tunnels, overpasses, mountain passes, and the like. Safety metrics or other safety data may include inspection ratings, user feedback ratings, accident metrics, traffic congestion, weather hazards (e.g., risk of mudslides, rock falls, or wash outs), or condition of a transportation structure. The route planning database 116 may be implemented as a relational database, a centralized database, a distributed database, an object oriented database, or a flat database in various embodiments. In some embodiments, the route planning database 116 may include data that is periodically or regularly updated, mirrored, synchronized, replicated, or otherwise provided by an external data source (e.g., the safety database 120).

The safety database 120 may include data related to inspections of a transportation structure. The safety database 120 may be managed by a municipal, county, state, or federal entity or office, such as the National Transportation Safety Board (NTSB), United Stated Department of Transportation (USDOT), Federal Highway Administration (FHWA), or various state departments of transportation (e.g., the Minnesota Department of Transportation (MnDOT)). The safety database 120 may include one or more historical inspection reports, such as annual inspections. The safety database 120 may also include accident reports, investigative reports, or other information related to transportation structures included in the safety database 120. For example, if a tugboat runs into a pier supporting a bridge, the safety database 120 may include an accident report describing the incident, a investigative report describing a possible cause of the accident. The investigative report may also include an indication of whether and to what extent the collision may have caused any structural damage affecting the safety rating of the bridge. Such information may be organized and stored in the safety database 120.

In an embodiment, a user (not shown) at a client computer 104 may interface with the route planning system 102, such as by using the web server 108, to initiate a route planning activity. The route planning activity may include activities, such as preparing a travel itinerary, providing travel preferences, obtaining a map related to a route, and obtaining directions to a destination. The user may be presented one or more questions with relevant options for answers using user-interface elements, such as drop down lists, check boxes, radio buttons, text input fields, or the like. The user-interface may be implemented using a variety of programming languages or programming methods, such as HTML, VBScript, JavaScript, XML, XSLT, AJAX, Java, and Swing.

Figure 2:
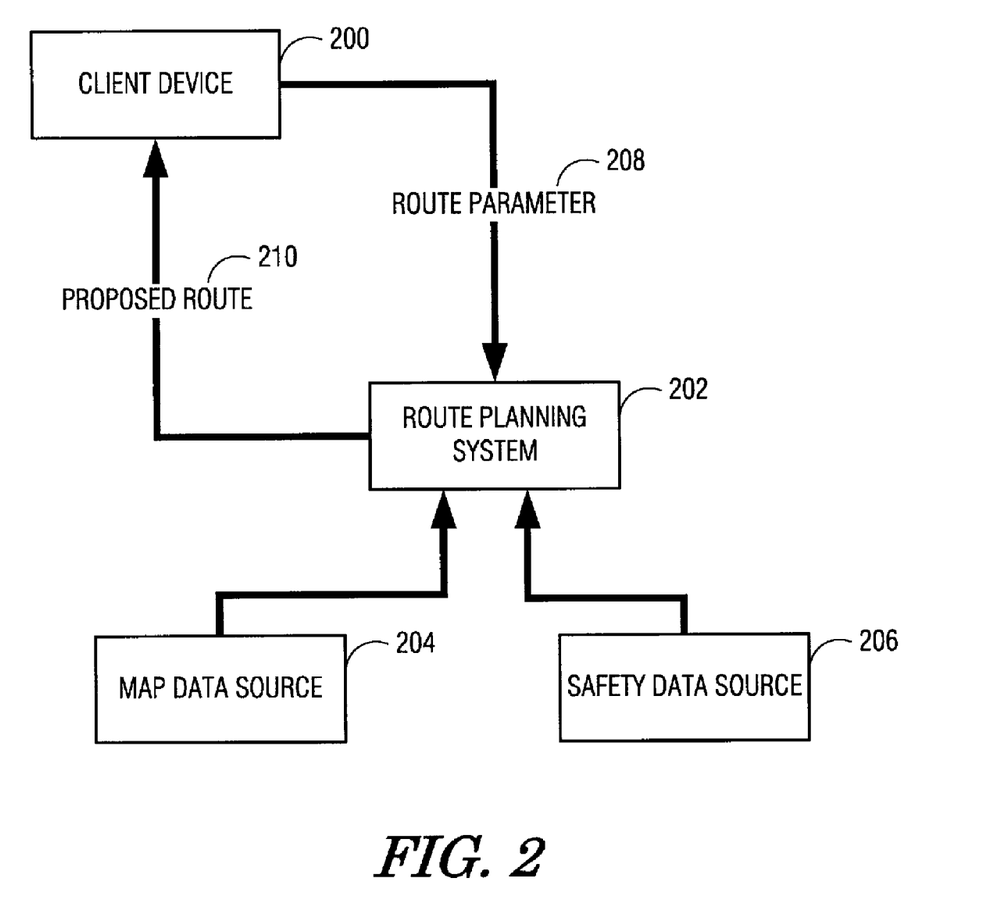
FIG. 2 is a block diagram illustrating data flow, in accordance with an example embodiment.

FIG. 2 is a block diagram illustrating data flow, in accordance with an example embodiment. The elements illustrated in FIG. 2 include a client device 200, a route planning system 202, a map data source 204, and a safety data source 206. The client device 200 may include or be included in a client interface device, such as the client computer 104. The route planning system 202 may include some or all of the components illustrated in route planning system 102 in FIG. 1. The map data source 204 may include information such as survey maps, computer-generated maps, satellite images, nautical maps, roadway maps, or the like. The map data source 204 may be included in the route planning database 116. In addition, the map data source 204 may be provided by an external source, such as a governmental, commercial, or educational institutions. The safety data source 206 may include or be included in the safety database 120.

During operation, one or more route parameters 208 may be communicated from the client device 200 to the route planning system 202. The route parameters 208 may include data such as a starting address, a destination address, a minimum acceptable or target safety rating of transportation structures, a weighting of various factors related to the route to be planned, locations of interest to be included in the route to be planned, or other parameters related to route planning or itinerary planning. The various factors related to the route to be planned may include a preference to minimize the amount of time spent traveling, a preference to minimize the distance traveled, a preference to maximize the reliability or safety of a proposed route, a relative importance of one factor over another (e.g., emphasizing the reliability of safety of a route at the expense of timeliness).

The minimum acceptable safety rating, which may also be classified as a reliability rating, may be provided as a single rating reflecting a minimum acceptable rating for all transportation structures in general or as a group of different safety ratings that correspond with different types of transportation structures. For example, a minimum safety rating of four out of ten may be indicated for tunnels, whereas a minimum safety rating of seven out of ten may be indicated for bridges. As another example, transportation structures may be further grouped into subsets using a data corresponding with the structure, such as the age of the structure, the type of construction, the design of the structure, environmental factors that may affect the structural integrity of the transportation structure, and the like.

The route planning system 202 may access data from the map data source 204 and the safety data source 206 to produce a proposed route based on the route parameters 208 provided by the client device 200. In particular, the route planning system 202 may use data from the map data source 204 to construct one or more routes from a starting location to an ending location and then use data from the safety data source 206 to modify the constructed routes. The modifications may include removing portions of a constructed route that fail to meet a safety preference recited in the route parameters 208. For example, a safety preference may indicate a minimum safety rating of a bridge or overpass and the route planning system 202 may take this into account when constructing a proposed route to avoid or minimize the use of bridges or overpasses that fail to meet the safety preference. As another example, the safety preference may indicate a preference to avoid or favor certain types of bridge designs or constructions when determining a proposed route. Bridge designs may be characterized by their general type (e.g., suspension, cantilever, truss, arch, beam and girder, etc.) or by their specific type (e.g., cable-stayed suspension, cantilever through truss, Wichert truss, fixed hingeless arch, king post truss, etc.). Bridge data may be obtained from a governmental agency (e.g., the FHWA's National Bridge Inventory system, state-level departments of transportation, etc.), private entities, educational institutions, etc. Combinations or permutations of safety preferences may be used to customize a proposed route.

In an embodiment, the route planning system 202 generates a route using weighted factors. The weighted factors may be provided by a user via the client device 200 or the weighted factors may be derived from related information. For example, the type of travel (e.g., business or pleasure), the participants in the travel (e.g., a single person or a family of five), the destination location, the beginning location, the mode of travel, or other characteristics of the travelers, the transportation used, or the locations visited or traveled through may be used to derive a weighting of the various factors.

After generating a route using the route parameters 208 provided, the route planning system 202 communicates at least one proposed route 210 to the client device 200. The client device 200, or a user using the client device 200, may accept or reject the proposed route 210 and provide a alternative set of route parameters 208 to the route planning system 202. In an embodiment, the client device 200, or a user using the client device 200, does not need to provide express acceptance of the proposed route 210, simply using the proposed route 210 without attempting to generate another route is implied acceptance. In some embodiments, an express acceptance is used by the route planning system 202 as an indication of an acceptable route with the route parameters 208 provided or other factors. For example, the route planning system 202 may then use the accepted route when generating routes for other similar requests with similar parameters.

Figure 3:
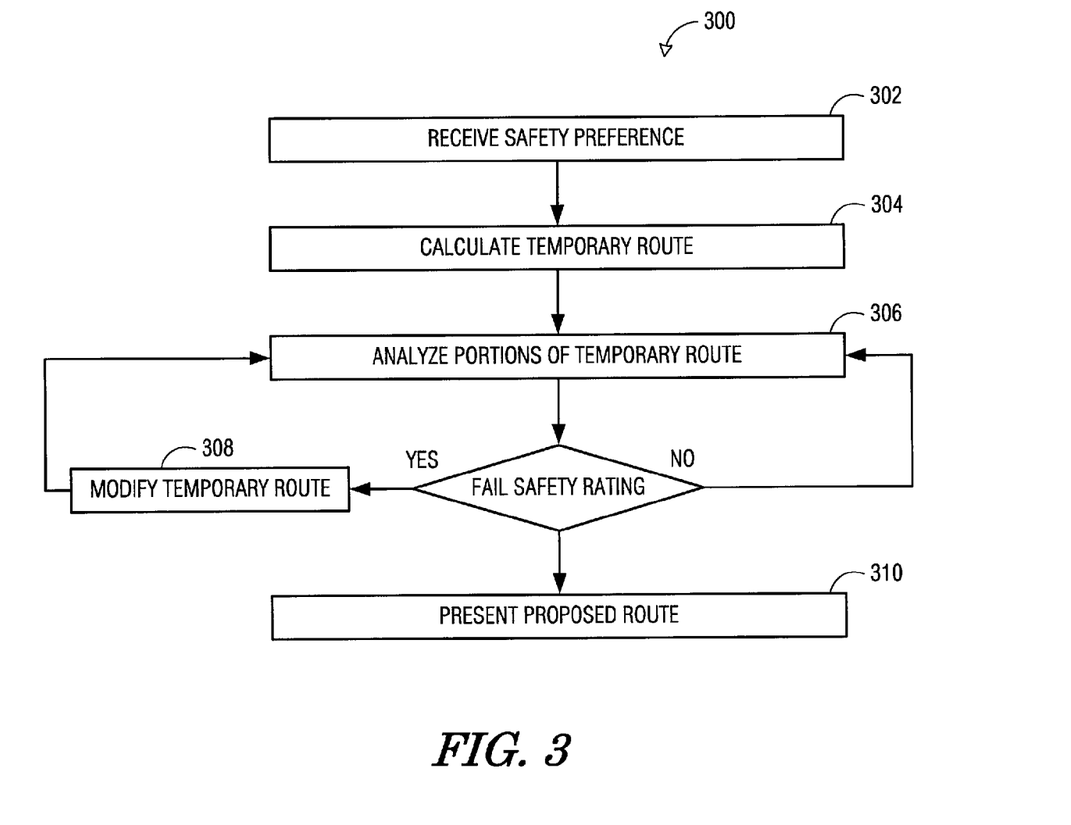
FIG. 3 is a flow diagram illustrating a method of generating a travel route, in accordance with an example embodiment.

FIG. 3 is a flow diagram illustrating a method 300 of generating a travel route, in accordance with an example embodiment. At 302, a safety preference is received. The safety preference may be provided using a numerical indication (e.g., 4 out of 5, 8 stars), an alphanumeric indication (e.g., "good", "better", "best", "5 star"), or other indicia.

At 304, one or more temporary routes are calculated from a starting location to a destination location. As an example, the temporary routes may be calculated using a hierarchy or an ordering, such as calculating routes minimizing distance first, then selecting routes from the calculated routes with an emphasis on minimizing travel time. As another example, the temporary routes may be calculated by separately or independently calculating routes that minimize travel time and travel distance, and then selecting routes that substantially overlap.

At 306, one or more portions of the temporary routes are analyzed to determine if they meet or exceed the safety preference provided at 302. If a portion of a temporary route fails to meet the safety preference, then at 308, the temporary route is modified to exclude the portion identified as being insufficiently safe. If a modification renders a temporary route unusable, or there is no modification that could be made to accommodate the safety preference, then the temporary route may be discarded.

After the temporary routes have been modified to avoid any identified unsafe portions, then at 310, the temporary routes are presented as one or more proposed routes.

Figure 4:
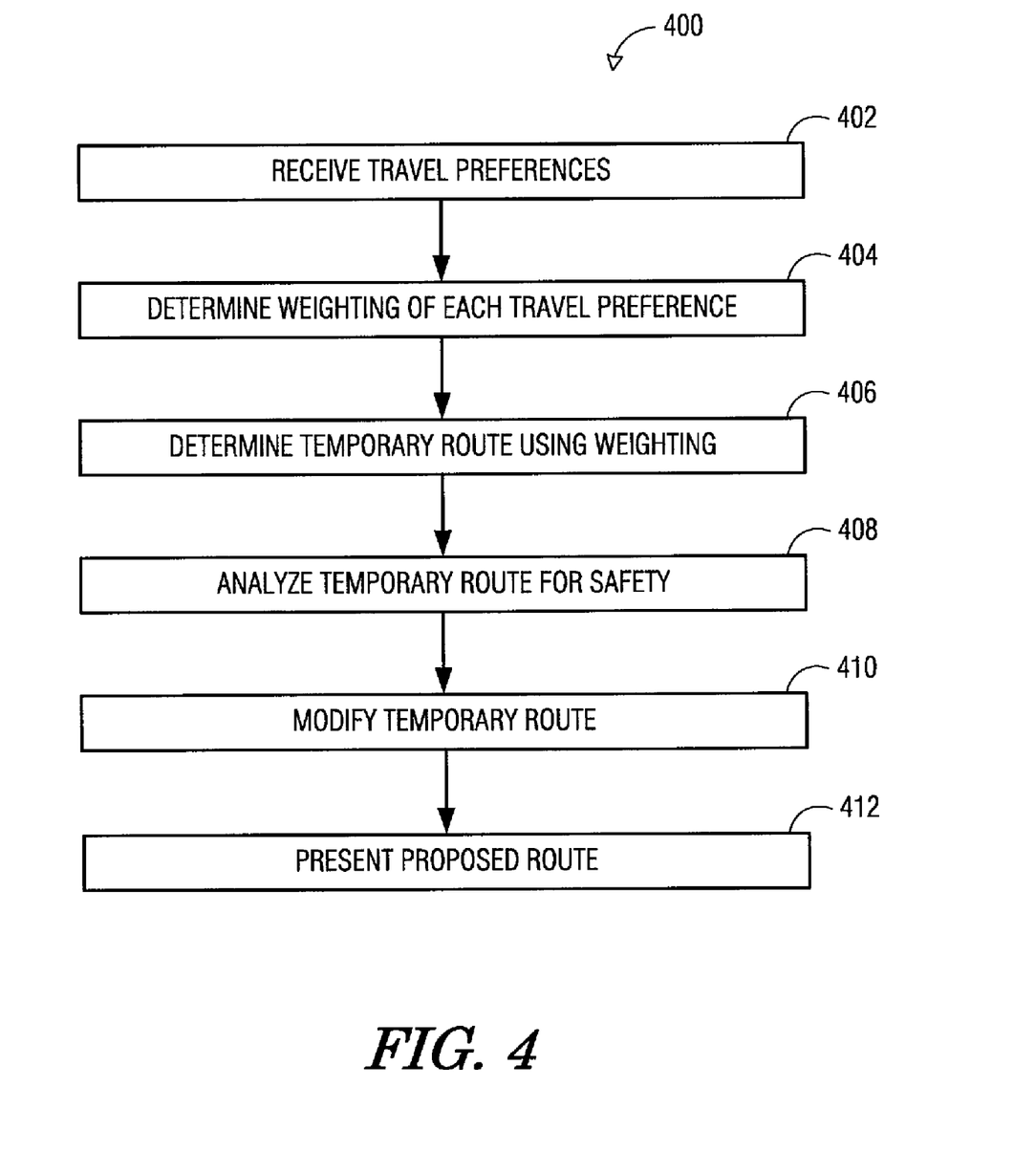
FIG. 4 is a flow diagram illustrating a method of generating a travel route using two or more factors, in accordance with an example embodiment.

FIG. 4 is a flow diagram illustrating a method 400 of generating a travel route using two or more factors, in accordance with an example embodiment. At 402, two or more travel preferences are received. The travel preferences may include preferences such as a preference to minimize travel time, travel distance, or dangerous travel conditions. The travel preferences may also include a minimum safety rating of transportation structures encountered on a proposed route. Other travel preferences may be provided as well, such as a travel time period (e.g., departure and arrival dates or times), preferred travel time (e.g., driving after hours to avoid traffic congestion), or travel style (e.g., scenic country road routes preferred over interstate highway routes).

At 404, a weighting of each travel preference is determined. In an embodiment, the travel preferences are weighted by a user who provided the travel preferences. In another embodiment, the travel preferences are weighted using information related to the travel route, for example, the number of travelers, the reason or type of travel, the destination, the dates of travel, etc. For example, if the dates of travel define a relatively short period and the distance to be traveled is calculated to be relatively long, then minimizing travel time may be weighted more than maximizing safe routes.

At 406, one or more temporary routes are determined using the weighted factors as guidance. At 408, one or more portions of each temporary route is analyzed to determine whether the portion has a deficient safety rating. At 410, portions of temporary routes with deficient safety ratings are modified (e.g., re-routed) if possible and presented (block 412) as one or more proposed routes.

Figure 5:
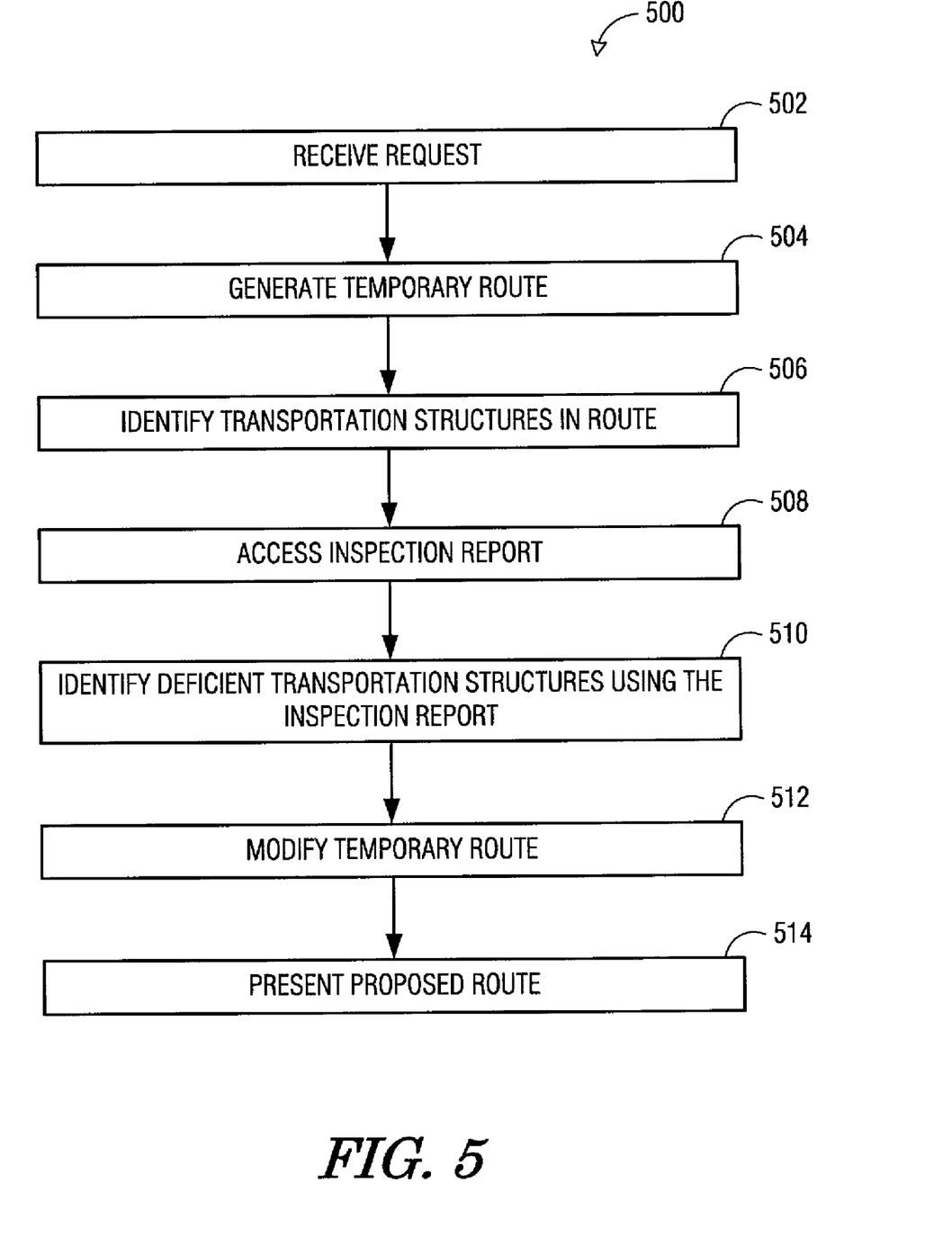
FIG. 5 is a flow diagram illustrating a method of generating a travel route using historical inspection data, in accordance with an example embodiment.

FIG. 5 is a flow diagram illustrating a method 500 of generating a travel route using historical inspection data, in accordance with an example embodiment. At 502, a request to generate a travel route is received. The request may include one or more parameters, such as a starting location, an ending location, a start travel date, an end travel date, a minimum acceptable safety rating or reliability rating of transportation structures, and the like.

At 504, one or more temporary routes are generated using the parameters in the request. At 506, one or more transportation structures are identified in the temporary routes. In an embodiment, the method 500 attempts to identify every transportation structure in each temporary route. In another embodiment, the method 500 uses a filter to identify a selection of transportation structures in the temporary routes. As an example, the filter may be provided by a user who provided the request. In another example, the filter may be defined by a route planning system provider, such a filter may be provided as a default filter that can be modified by a user or a client. A filter may include or exclude transportation structures based on one or more characteristics related to a transportation structure, such as age, type of construction, design, etc.

At 508, one or more inspection reports are accessed one or more of the identified transportation structures. Inspection reports may be accessed from a safety or inspection database, such as the safety database 118. Inspection reports may be accessed from one or more sources. For example, in an embodiment, the method 500 accesses a single inspection database, such as a federal inspection database. In another embodiment, the method 500 access several inspection databases (e.g., federal, state, and local) and compiles the results.

At 510, the inspection reports are used to identify transportation structures that fail to meet the minimum acceptable safety rating. As mentioned above, the minimum acceptable safety rating may be provided in the request. In some embodiments, the minimum acceptable safety rating is, set at a system-level, accessed from saved user preferences or options, or otherwise obtained. The one or more inspection reports may be analyzed to determine whether key words, such as "deficient" or "recommend replacement" exist in the inspection report. Finding such keywords may influence the safety rating of the corresponding transportation structure. As another example, an inspection report may analyzed for historical changes, such as a change in classification of a transportation structure or other changes in use or characterization of a transportation structure. For example, a bridge may have a safety rating of five out of ten when classified for 1-ton trucks. However, when analyzing the inspection reports for the bridge, it may be found that the bridge had a safety rating of two in its original classification for 2-ton trucks and that a re-classification was done to effectively increase the safety rating. Such evidence may be used to influence the effective safety rating of the bridge.

At 512, the temporary routes are modified to remove portions of the route that include transportation structures that fall below the minimum safety rating. At 514, the modified transportation routes are presented as one or more proposed routes.

Figure 6:
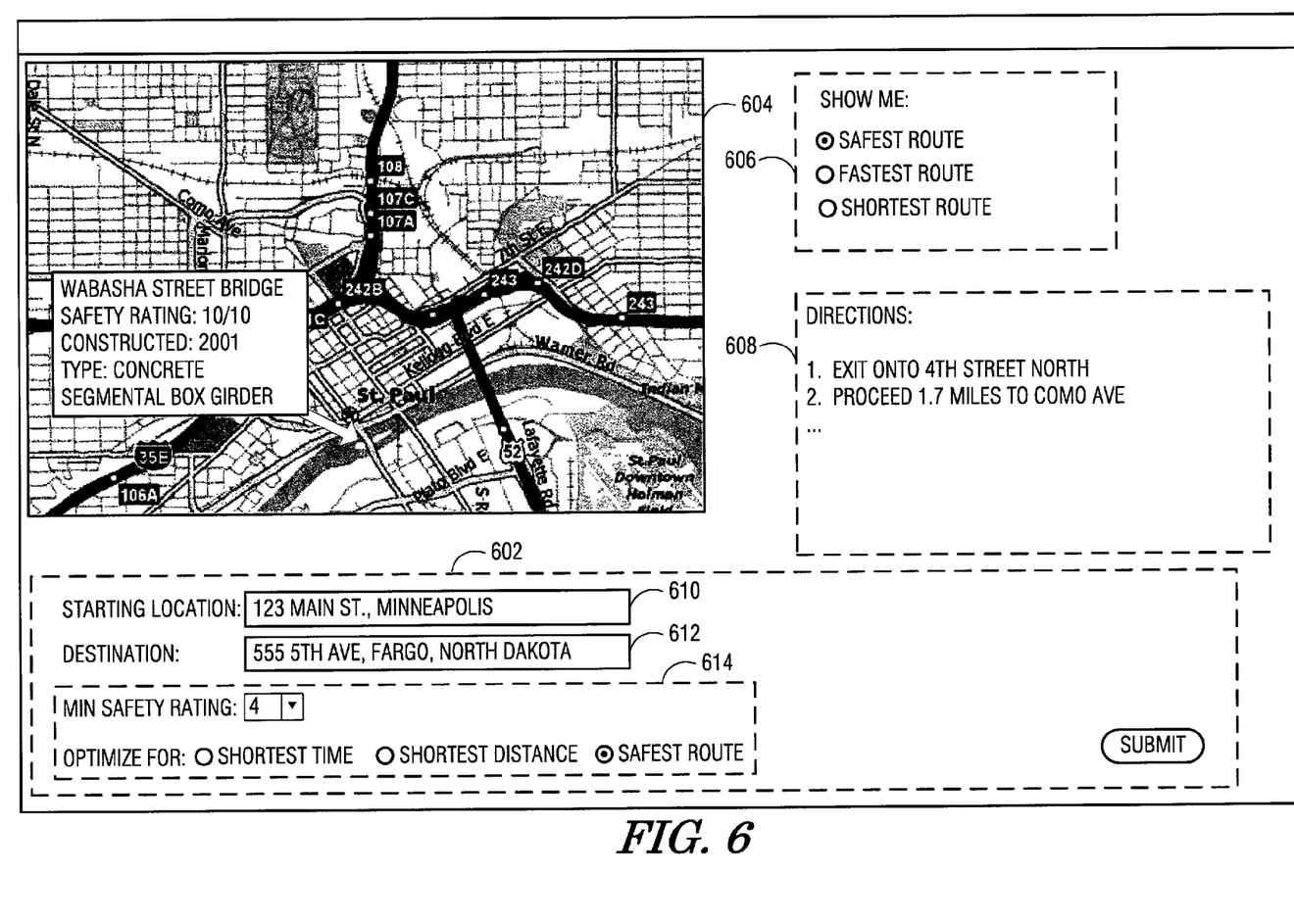
FIG. 6 is a user-interface, in accordance with an example embodiment.

FIG. 6 is a user-interface 600, in accordance with an example embodiment. The user-interface 600 includes a parameter input portion 602, a map display portion 604, a route selection portion 606, and a route directions portion 608. The parameter input portion 602 includes a starting location input control area 610, a destination location input control area 612, and a preferences control area 614. The preferences control area 614 may be used to provide one or more preferences that may be used to affect the routes considered, as described above. The map display portion 604 may display a portion or all of the currently selected route, as identified from the route selection portion 606. The map display portion 604 may be manipulated by the user, for example, panned, scrolled, or zoomed, to display a map in more or less detail. A map of the route displayed in the map display portion 604 may include indicia identifying transportation structures that are included in the displayed route. The indicia may include graphical icons to indicate one or more characteristics of a transportation structure (e.g., a safety rating), or a pop-up window or pop-up element to display additional information about a corresponding transportation structure. Other user-interface elements may be used to assist the user to quickly and effectively identify transportation structures and characteristics of the transportation structures. User-interface elements may be provided for transportation structures found anywhere on the displayed map or for only those transportation structures found along the displayed route. The route selection portion 606 may list one or more proposed routes. The proposed routes may be ranked or ordered according to various criteria, such as by distance, travel time, relative safety, or combinations of criteria. An indication of the relative safety of a route may be displayed to correspond with the route. For example, a ranking according to distance may also include a relative safety rating, for example, using a percentage value where 100% indicates relatively completely safe in a parenthetical summary after a route description. The route directions portion 608 may be used to display general or detailed directions corresponding to a portion or all of a selected route.

Figure 7:
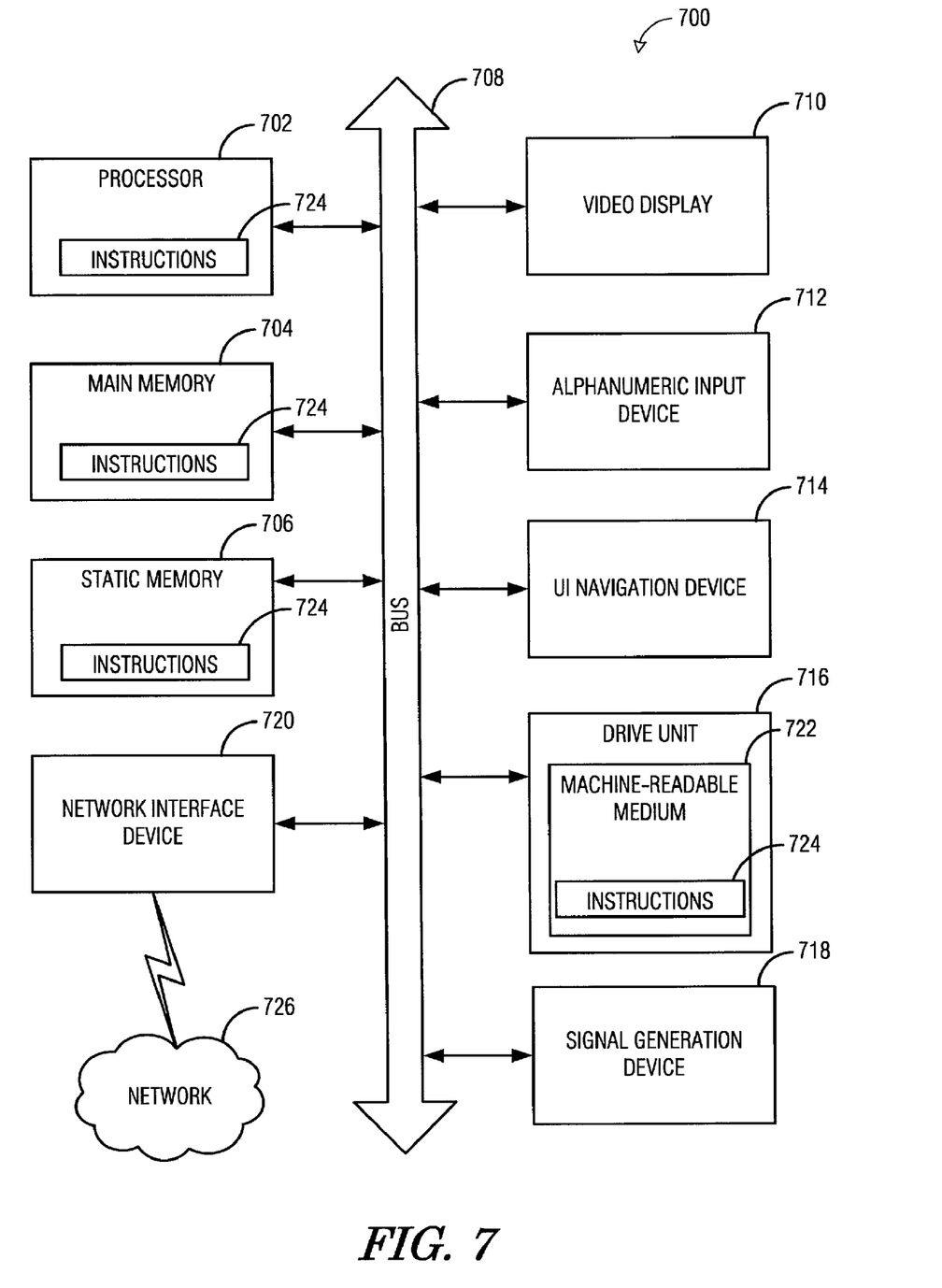
FIG. 7 is a block diagram of a machine in the example form of computer system within which a set of instructions, for causing the machine to perform any one or more of the methodologies discussed herein, may be executed, in accordance with an example embodiment.

FIG. 7 is a simplified block diagram of a machine in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a plasma display, a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 may include machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, where the main memory 704 and the processor 702 also constitute machine-readable, tangible media.

Software 724 may further be transmitted or received over network 726 via network interface device 720 utilizing any one of a number of well-known transfer protocols (e.g., HTTP).

While machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. This disclosure is intended to cover any and all adaptations or variations of various embodiments. Combinations of the above embodiments, and other embodiments not specifically described herein, will be apparent to those of skill in the art upon reviewing the above description. For example, one functional, computational, or hardware module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the appended claims, the terms "including" and "in which" are used as the plain-English equivalents of the respective terms "comprising" and "wherein," respectively. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or a particular ordering on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, at a processor-based system, a safety preference indicating a minimum acceptable safety rating of a type of a transportation structure, the minimum acceptable safety rating indicative of a minimum acceptable structural integrity of the type of transportation structure;
   calculating, at the processor-based system, a temporary route;
   analyzing, at the processor-based system, a portion of the temporary route to determine whether the portion is sufficiently safe based on the safety preference, wherein analyzing includes:

accessing an inspection record stored at a federal, state, or local government database, the inspection record corresponding to a transportation structure of the type indicated by the safety preference and found in the portion of the temporary route; and determining a discrete safety rating for the transportation structure based on the inspection record, the discrete safety rating indicative of a structural integrity of the transportation structure; and modifying, at the processor-based system, the portion of the temporary route when the portion is determined not sufficiently safe by excluding transportation structures from the temporary route with a discrete safety rating less than the minimum acceptable safety rating; and presenting, with the processor-based system, the temporary route.

2. A method comprising:

receiving, at a processor-based system, a plurality of travel preferences, wherein the plurality of travel preferences comprise a first travel preference, a second travel preference, and a third travel preference, and wherein the first travel preference is to minimize the time spent traveling, and wherein the second travel preference is to minimize the distance traveled, and a third travel preference is to maximize the safety of travel;

determining, at the processor-based system, a weighting of each preference in the plurality of travel preferences;

determining, at the processor-based system, a temporary route based on the weighting of each preference;

analyzing, at the processor-based system, the temporary route to determine whether the temporary route is sufficiently safe wherein analyzing includes:

accessing an inspection record stored at a federal, state, or local government database, the inspection record corresponding to a transportation structure found in the temporary route; and determining a discrete safety rating for the transportation structure based on the inspection record, the discrete safety rating indicative of a structural integrity of the transportation structure; and modifying, at the processor-based system, the temporary route when the temporary route is determined not sufficiently safe by excluding transportation structures from the temporary route with a discrete safety rating less than a minimum acceptable safety rating; and presenting, with the processor-based system, the temporary route.

3. A method comprising:

receiving from a user, at a processor-based system, a request to generate a travel route, the request including a minimum acceptable safety rating of a type of transportation structure, the minimum acceptable safety rating indicative of a minimum acceptable structural integrity of the type of transportation structure;

generating, at the processor-based system, a temporary travel route using the request;

identifying in the temporary route, at the processor-based system, a transportation structure of the type in the request;

accessing, using the processor-based system, an inspection record stored at a federal, state, or local government database, the inspection record corresponding to the transportation structure;

determining, at the processor-based system, a discrete safety rating for the transportation structure based on the inspection record, the discrete safety rating indicative of a structural integrity of the transportation structure;

modifying, at the processor-based system, the temporary route when the discrete safety rating for the transportation structure is less than the minimum acceptable safety rating; and presenting, with the processor-based system, the temporary route.

4. A system comprising:

a memory; and a processing module coupled to the memory, wherein the processing module is configured to:

access a safety preference from the memory, the safety preference indicating a minimum acceptable safety rating of a type of a transportation structure, the minimum acceptable safety rating indicative of a minimum acceptable structural integrity of the type of transportation structure;

calculate a temporary route;

analyze a portion of the temporary route to determine whether the portion is sufficiently safe based on the safety preference, wherein analyzing includes:

accessing an inspection record stored at a federal, state, or local government database, the inspection record corresponding to a transportation structure of the type indicated by the safety preference and found in the portion of the temporary route; and determining a discrete safety rating for the transportation structure based on the inspection record, the discrete safety rating indicative of a structural integrity of the transportation structure; and modify the portion of the temporary route when the portion is determined not sufficiently safe by excluding transportation structures from the temporary route with a discrete safety rating less than the minimum acceptable safety rating; and present the temporary route.

5. A system comprising:

a memory; and a processing module coupled to the memory, wherein the processing module is configured to:

access a plurality of travel preferences from the memory, wherein the plurality of travel preferences comprise a first travel preference, a second travel preference, and a third travel preference, and wherein the first travel preference is to minimize the time spent traveling, and wherein the second travel preference is to minimize the distance traveled, and a third travel preference is to maximize the safety of travel;

determine a weighting of each preference in the plurality of travel preferences;

determine a temporary route based on the weighting of each preference;

analyze the temporary route to determine whether the temporary route is sufficiently safe, wherein analyzing includes:

accessing an inspection record stored at a federal, state, or local government database, the inspection record corresponding to a transportation structure found in the temporary route; and determining a discrete safety rating for the transportation structure based on the inspection record, the discrete safety rating indicative of a structural integrity of the transportation structure; and modify the temporary route when the temporary route is determined not sufficiently safe by excluding transportation structures from the temporary route with a discrete safety rating less than a minimum acceptable safety rating; and present the temporary route.

6. A system comprising:
a memory; and
a processing module coupled to the memory, wherein the processing module is configured to:
- access a request to generate a travel route from the memory, the request including a minimum acceptable safety rating of a type of transportation structure, the minimum acceptable safety rating indicative of a minimum acceptable structural integrity of the type of transportation structure;
- generate a temporary travel route using the request;
- identify in the temporary route, a transportation structure of the type in the request;
- access an inspection record stored at a federal, state, or local government database, the inspection record corresponding to the transportation structure;
- determine a discrete safety rating for the transportation structure based on the inspection record, the discrete safety rating indicative of a structural integrity of the transportation structure;
- modify the temporary route when the discrete safety rating for the transportation structure is less than the minimum acceptable safety rating; and
- present the temporary route.

7. A non-transitory computer-readable medium including instructions that, when executed on a computer, cause the computer to:
- receive a safety preference indicating a minimum acceptable safety rating of a type of a transportation structure, the minimum acceptable safety rating indicative of a minimum acceptable structural integrity of the type of transportation structure;
- calculate a temporary route;
- analyze a portion of the temporary route to determine whether the portion is sufficiently safe based on the safety preference, wherein analyzing includes:
  - accessing an inspection record stored at a federal, state, or local government database, the inspection record corresponding to a transportation structure of the type indicated by the safety preference and found in the portion of the temporary route; and
  - determining a discrete safety rating for the transportation structure based on the inspection record, the discrete safety rating indicative of a structural integrity of the transportation structure; and
- modify the portion of the temporary route when the portion is determined not sufficiently safe by excluding transportation structures from the temporary route with a discrete safety rating less than the minimum acceptable safety rating; and
- present the temporary route.

8. The non-transitory computer-readable medium of claim 7, wherein the safety preference is to avoid a type of transportation structure.

9. The non-transitory computer-readable medium of claim 7, wherein the safety preference is to favor a type of transportation structure.

10. The non-transitory computer-readable medium of claim 7, wherein the type of the transportation structure comprises a road, bridge, or tunnel.

11. A non-transitory computer-readable medium including instructions that, when executed on a computer, cause the computer to:
- receive a plurality of travel preferences, wherein the plurality of travel preferences comprise a first travel preference, a second travel preference, and a third travel preference, and wherein the first travel preference is to minimize the time spent traveling, and wherein the second travel preference is to minimize the distance traveled, and a third travel preference is to maximize the safety of travel;
- determine a weighting of each preference in the plurality of travel preferences;
- determine a temporary route based on the weighting of each preference;
- analyze the temporary route to determine whether the temporary route is sufficiently safe, wherein analyzing includes:
  - accessing an inspection record stored at a federal, state, or local government database, the inspection record corresponding to a transportation structure found in the temporary route; and
  - determining a discrete safety rating for the transportation structure based on the inspection record, the discrete safety rating indicative of a structural integrity of the transportation structure; and
- modify the temporary route when the temporary route is determined not sufficiently safe by excluding transportation structures from the temporary route with a discrete safety rating less than a minimum acceptable safety rating; and
- present the temporary route.

12. The non-transitory computer-readable medium of claim 11, wherein the instructions to modify the temporary route comprises instructions to reroute to avoid a portion of the temporary route identified as being insufficiently safe.

13. A non-transitory computer-readable medium including instructions that, when executed on a computer, cause the computer to:
- receive a request to generate a travel route, the request including a minimum acceptable safety rating of a type of transportation structure, the minimum acceptable safety rating indicative of a minimum acceptable structural integrity of the type of transportation structure;
- generate a temporary travel route using the request;
- identify in the temporary route, a transportation structure of the type;
- access an inspection record stored at a federal, state, or local government database, the inspection record corresponding to the transportation structure;
- determine a discrete safety rating for the transportation structure based on the inspection record, the discrete safety rating indicative of a structural integrity of the transportation structure;
- modify the temporary route when the discrete safety rating for the transportation structure is less than the minimum acceptable safety rating; and
- present the temporary route.

14. The non-transitory computer-readable medium of claim 13, wherein the instructions to determine whether the transportation structure is sufficiently safe based on the inspection record comprise instructions to use keyword analysis of the inspection record.

15. The non-transitory computer-readable medium of claim 13, wherein the instructions to determine whether the transportation structure is sufficiently safe based on the inspection record comprise instructions to:
- analyze the inspection record for a reclassification of a safety rating;
- determine whether the reclassification was performed to effectively increase the safety rating; and
- influence the determination of whether the transportation structure is sufficiently safe based on the determination of whether the reclassification was performed to effectively increase the safety rating.

16. The non-transitory computer-readable medium of claim 13, wherein the transportation structure comprises a road, bridge, or tunnel.

17. The non-transitory computer-readable medium of claim 13, wherein the instructions to determine whether the transportation structure is sufficiently safe based on the inspection record comprise instructions to:
   compile inspection records from two or more of the federal, state, or local government databases; and
   determine whether the transportation structure is sufficiently safe based on the compiled inspection records.

* * * * *

UNITED STATES PATENT AND TRADEMARK OFFICE
CERTIFICATE OF CORRECTION

PATENT NO. : 8,315,792 B2
APPLICATION NO. : 11/838101
DATED : November 20, 2012
INVENTOR(S) : Speier et al.

It is certified that error appears in the above-identified patent and that said Letters Patent is hereby corrected as shown below:

On the title page, in column 1, under "U.S. Patent Documents", line 4, after "5,798,949 8/1998 Kaub 703/6", insert --5,982,278 11/1999 Cuvelier, M.--, therefor On the title page, in column 1, under "U.S. Patent Documents", line 7, after "6,192,758 2/2001 Huang 73/579", insert --6,401,030 6/2002 Watanabe et al.
6,542,812 4/2003 Obradovich et al.
6,622,084 9/2003 Cardno et al.--, therefor On page 2, in column 1, under "U.S. Patent Documents", line 2, after "2003/0135304 A1" 7/2003 Sroub et al. 701/1" insert --2004/0243299 A1 12/2004 Scaer et al.
2005/0024238 A1 2/2005 Kimura--, therefor On page 2, in column 1, under "U.S. Patent Documents", line 3, after "2005/0055248 A1 3/2005 Helitzer et al.", insert --2005/0065711 A1 3/2005 Dahlgren et al.
2006/0173841 A1 8/2006 Bill--, therefor On page 2, in column 1, under "U.S. Patent Documents", line 5, after "2006/0247852 A1 11/2006 Kortge et al." insert --2007/0005240 A1 1/2007 Oumi et al.--, therefor On page 2, in column 2, under "Other Publications", line 3, after "International Application Serial No. PCT/US2008/009683, Written Opinion mailed Oct. 6, 2009", 7 pgs.", insert --"U. S. Appl. Serial No. 12/673,417, Non Final Office Action mailed Sep. 07, 2012" 9 pgs.
U. S. Appl. Serial No. 12/673,417, Preliminary Amendment mailed Feb. 12, 2010," 3 pgs.--, therefor In column 9, line 32, in Claim 2, after "safe", insert --,--, therefor In column 12, line 41, in Claim 13, after "type", insert --in the request--, therefor Signed and Sealed this
Second Day of April, 2013

Teresa Stanek Rea
*Acting Director of the United States Patent and Trademark Office*